(12) United States Patent
Imai et al.

(10) Patent No.: US 6,771,882 B1
(45) Date of Patent: Aug. 3, 2004

(54) DATA TRANSMISSION APPARATUS AND DATA TRANSMISSION METHOD

(75) Inventors: Kenichiro Imai, Tokyo (JP); Yuka Nara, Miyagi (JP)

(73) Assignee: Sony Corporation, Tokyo (JP)

( * ) Notice: Subject to any disclaimer, the term of this patent is extended or adjusted under 35 U.S.C. 154(b) by 762 days.

(21) Appl. No.: 09/631,592

(22) Filed: Aug. 3, 2000

(30) Foreign Application Priority Data

Aug. 5, 1999 (JP) .......................................... 11-222996

(51) Int. Cl.⁷ .......................... H04N 5/76; H04N 5/783
(52) U.S. Cl. .......................... 386/67; 386/124; 386/68
(58) Field of Search ........................... 386/6–8, 33, 35, 386/37, 40, 68, 81, 111, 112, 124, 67; H04N 5/76, 9/79, 5/783

(56) References Cited

U.S. PATENT DOCUMENTS 5,359,584 A * 10/1994 Fukushima et al. ...... 369/53.24
RE37,810 E * 7/2002 Oikawa ....................... 386/74

* cited by examiner

*Primary Examiner*—Thai Tran
(74) *Attorney, Agent, or Firm*—Frommer Lawrence & Haug LLP; William S. Frommer

(57) ABSTRACT

Data subjected to still reproduction can be recorded in the SDL mode of the DV format. A DFF (DIF frame flag) is added to the header section H0 of each DIF blcok when transmitting DV data reproduced in the SDL mode of the DV format by way of an IEEE 1394 bus. A DFF is a code used to discriminate the a front frame (with track numbers 0 through 4) from a rear frame (with track numbers 5 through 9) after the frame is transmitted.

6 Claims, 18 Drawing Sheets

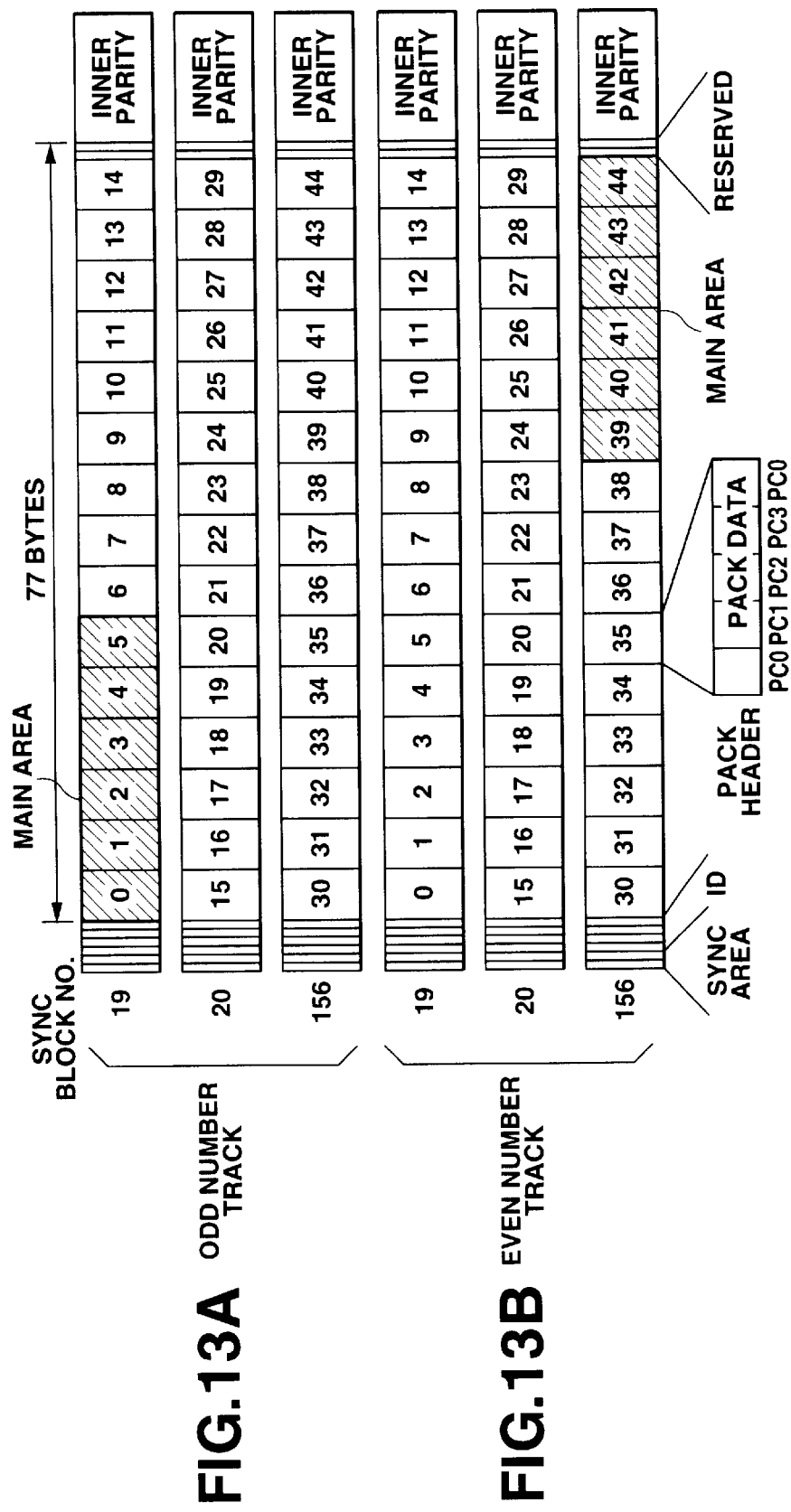
FIG.13A ODD NUMBER TRACK
FIG.13B EVEN NUMBER TRACK

FIG.15A
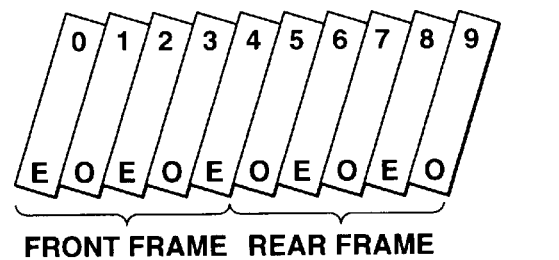
FRONT FRAME  REAR FRAME
↓ STILL REPRODUCTION
FIG.15B TRANSMISSION SIDE
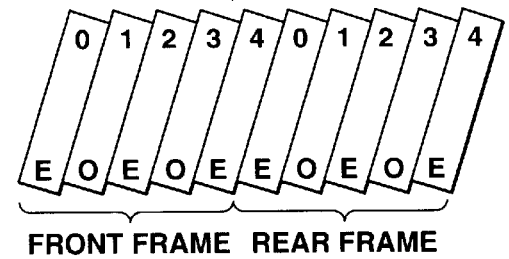
FRONT FRAME  REAR FRAME
↓ DATA TRANSMISSION ONTO IEEE 1394 BUS
FIG.15C RECEPTION SIDE
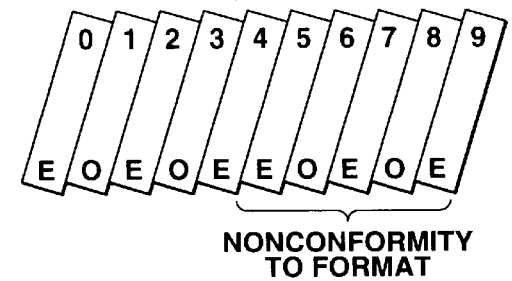
NONCONFORMITY TO FORMAT

| SYSTEM TYPE | | DFF | MEANING |
|---|---|---|---|
| SD | ANY SYSTEM | 1 ONLY | NOT USED |
| SDL | 525~60 SYSTEM | 0 | FIRST FRAME |
| | | 1 | SECOND FRAME |
| | 625~50 SYSTEM | 1 ONLY | NOT USED |
| HD | ANY SYSTEM | 1 ONLY | NOT USED |

NOTE
IN SDL 525~60 SYSTEM, DFF SHOULD BE TRANSMITTED "1" OR "0" ALTERNATELY ON THE PLAYBACK SIDE IN ANY PLAYBACK SPEED.

DATA TRANSMISSION APPARATUS AND DATA TRANSMISSION METHOD

BACKGROUND OF THE INVENTION

1. Field of the Invention

This invention relates to a data transmission apparatus adapted to reproduce digital data from a tape-shaped recording medium in a format corresponding to the recording format of the tape-shaped recording medium that is used for recording the data of a frame including video data on an odd number of tracks and then transmit the reproduced data. The present invention also relates to a data transmission method to be used for such a data transmission apparatus.

2. Related Background Art

Recently, digital video tape recorders equipped with a video camera and console type digital video tape recorders are marketed for home use. Such digital video tape recorders are adapted to record digital video signals and digital audio signals on a magnetic tape.

A recording format referred to as DV format is known and used with digital video tape recorders of the above described category (IEC 61834 helical scan digital video tape cassette recording system using 6.35 mm magnetic tape for consumers (525/60, 625/50, 1125/60 and 1250/50 systems). With the DV format, the video signals to be recorded are compressed typically by means of a technique of so-called discrete cosine transform and a high data recording density is realized to make it possible to record high quality images for a long period of time than ever.

More specifically, with the DV format, video data are recorded in two recording modes (SD mode, SDL mode) that are different from each other in terms of compression ratio in order to achieve an optimal recording efficiency for any program that may be transmitted at any of a variety of bit rates.

In the recording mode for the higher recording efficiency (SDL mode), the compression ratio is made higher than that of the ordinary recording mode (SD mode) by using only a half of the amount of information of the SD mode and reducing the running speed of the magnetic tape to a half of that of the SD mode for recording/reproducing data. Then, data are recorded intermittently on the magnetic tape by way of the magnetic head in the SDL mode. In other words, in the SDL mode, data are not recorded continuously on the magnetic tape in terms of time and the number of times of recording data on the magnetic tape by way of the magnetic head is reduced to a half of that of the SD mode so that the magnetic tape may allow a total recording time twice as long as that of the SD mode. Then, useless data in the form of stuffing bytes and/or packs containing no information of a program that reduce the recording efficiency in the SD mode because of the low bit rate of the mode can be prevented from being recorded on the magnetic tape in the SD mode to consequently improve the recording efficiency.

Now, the DV format will be discussed further along with the SD mode and the SDL mode that are used for the DV format.

FIG. 1 is a schematic illustration of the track pattern of a 6.35 mm wide magnetic tape adapted to record digital data in the DV format (hereinafter referred to as DV tape).

In the DV format, data including video data are recorded on a 6.35 mm (=¼ inch) wide DV tape by way of a rotary drum. The rotary drum is typically provided with a pair of magnetic head with different azimuth angles (±20°). Then, the paired magnetic heads are made to scan the magnetic tape with a predetermined angle relative to the running direction of the tape to produce a track pattern of data-carrying tracks with two different azimuth angles that are arranged alternately as shown in FIG. 1.

Now, assume that every ten consecutive data-carrying tracks form a unit on the DV tape and track numbers of 0 through 9 are assigned to the ten tracks of each unit as shown in FIG. 2. Also assume that the tracks carrying the data recorded by one of the magnetic heads are referred to as even tracks E0, E2, E4, E6 and E8, whereas those carrying the data recorded by the other magnetic head are referred to as odd tracks O1, O3, O5, O7 and O9 to indicate the recording sequence. It will be appreciated that data are recorded on the tracks in the order of E0, O1, E2 and so on.

In the SD mode, the digital data of a frame are recorded on the ten tracks (with track numbers 0 through 9) of a unit out of a video signal of the NTSC system.

In the SDL mode, on the other hand, the digital data of two frames are recorded on the ten tracks (track numbers 0 through 9) of a unit out of a video signal of the NTSC system. More specifically, in the SDL mode, the digital data of a frame are recorded on the front five tracks (with track numbers 0 through 4) of a unit and the digital data of another frame are recorded on the rear five tracks (with track numbers 5 through 9) of the unit. Therefore, hereinafter, the frame recorded on the front five tracks (with track numbers 0 through 4) of a unit is referred to as front frame and the frame recorded on the rear five tracks (with track numbers 5 through 9) of the unit is referred to as rear frame.

Additionally, all the data recorded on each track are subjected to a 24/25 transform in the DV format. As the data to be recorded are subjected to a 24/25 transform, a pilot signal for ATF (automatic track finding) is laid on the entire track. Therefore, the magnetic head is made to readily operate for tracking by detecting the pilot signal when reproducing the recorded data. With the 24/25 transform, an extra bit (1 byte) is added to every 24 bits (3 bytes) of data to lay three low frequency pilot components on the string of the data to be recorded. More specifically, the run length of the data to be recorded is made not greater than 9 and pilot signal components with frequencies f0, f1 and f2 are laid on the data-carrying tracks. Then, in the DV format, typically the pilot signal component with frequency f0 is laid on the even tracks E0, E2, E4, E6 and E8, while the pilot signal components with frequencies f1 and f2 are laid alternately on the odd tracks O1, O3, O5, O7 and O9. Thus, a repetitive pattern of frequencies of . . . , f0, f1, f0, f2, f0, f1, f0, f2, . . . appears on the tracks for the pilot signal. As a result of recording a pilot signal showing such a pattern of frequencies, when the magnetic head is made to scan a track with a pilot signal component having the frequency of f0 in order to reproduce the recorded data, the pilot signal components with frequencies f1 and f2 are obtained as cross talk signal so that the magnetic head can be reliably made to operate for tracking.

A rotary drum 101 provided with three magnetic heads as shown in FIG. 3 is typically used for recording data both in the SD mode and the SDL mode. Referring to FIG. 3, CH0 head 102 and CH1 head 103 are arranged squarely opposite to each other on the rotary drum 101 with the axis of rotation of the drum disposed therebetween. The azimuth angle of the CH0 head 102 shows a positive value, whereas that of the CH1 head 103 shows a negative value. Additionally, CH2 head 104 is arranged on the rotary drum at a position upstream relative to the CH0 head 102 and displaced by 90° therefrom in the sense of rotation of the rotary drum.

The CH0 head 102 and the CH1 head 103 are used for recording in the SD mode, whereas the CH2 head 104 is left unused. In the SD mode, the DV tape is made to run at a constant speed of 18.8 mm/s while the rotary drum 101 is driven to rotate at a rate of 9,000 rpm. As shown in FIG. 4, the CH0 head 102 and the CH1 head 103 are consecutively switched from one to the other by a 150 Hz (1/150 second cycle) head SW signal for the operation of signal recording. Thus, an amount of information good for two tracks is recorded while the rotary drum is driven to make a full turn in the SD mode. Therefore, the tracks carrying the data recorded by the CH0 head 102 showing a positive azimuth angle and the tracks carrying the data recorded by the CH1 head 103 showing a negative azimuth angle are arranged alternately in the track pattern as shown in FIG. 5.

On the other hand, the CH0 head 102 and the CH2 head 104 are used for recording in the SDL mode, whereas the CH1 head 103 is left unused. In the SDL mode, the DV tape is made to run at a speed equal to a half of the speed in the SD mode while the rotary drum 101 is driven to rotate at a rate of 9,000 rpm as in the SD mode. As shown in FIG. 6, the CH0 head 102 and the CH2 head 104 are intermittently switched from one to the other by a 75 Hz (1/75 second cycle) head SW signal for the operation of signal recording. Thus, an amount of information good for two tracks is recorded while the rotary drum is driven to make two full turns in the SDL mode. Therefore, the tracks carrying the data recorded by the CH0 head 102 showing a positive azimuth angle and the tracks carrying the data recorded by the CH2 head 104 showing a negative azimuth angle are arranged alternately in the track pattern as shown in FIG. 7. Note that the CH2 head 104 is offset from the level of the CH0 head on the rotary drum 101 so that the pitch of arrangement of the tracks carrying the data recorded by the CH0 102 is made equal to that of the tracks carrying the data recorded by the CH2 head 104.

Thus, the amount of information recorded in the SDL mode per unit time is equal to a half of the amount of information recorded in the SD mode in the same period of time, whereby the same track pattern is used for the recording in either mode. It should be noted, however, that the recording method suited to the SDL mode is not limited to the use of a rotary drum 101 and paired heads including a positive azimuth head and a negative azimuth head that are arranged side by side may alternatively be used.

Now, the data structure of the DV format will be described below.

As shown in FIG. 8, each of the tracks of the DV tape has an ITI (Insert and Track Information) recording zone 111, an audio recording zone 112, a video recording zone 113 and a sub-code recording zone 114 arranged in the mentioned order as viewed from the head landing side to define the effective data area of the track. Audio information is recorded on the audio recording zone 112 along with auxiliary information. Video information is recorded on the video recording zone 113 along with auxiliary information. Sub-code information necessary for high speed search operations skipping actions and others is recorded in the sub-code recording zone 114. Information including reference signals for after-recording audio information, video information and sub-code information is recorded in the ITI recording zone 111.

In the DV format, the effective recording area of each of the tracks of the DV tape is divided into small sync blocks and the data to be recorded in a sync block is packeted. As shown in FIG. 9, a sync block contains a sync area (2 bytes), an ID code area (3 bytes), a data area (data volume being variable) and a parity data area (2 or 8 bytes). A predetermined synchronous pattern data (that becomes a bit pattern of 17 bits after a 24/25 transform) is recorded in the sync area. A 4-bit sequence number indicating the frame sequence, a 4-bit track pair number indicating the number of the related pair of an even number track and an odd number track, an 8-bit sync block number indicating the number of the sync block on the track and an 8-bit parity data for the ID code are recorded in the ID code area.

An amount of data good for 17 sync blocks are recorded as audio information in the audio recording zone 112 of each track as shown in FIG. 10. Numbers 0 through 16 are assigned respectively to the 17 sync blocks.

The first two sync blocks (with sync block numbers 0 and 1) are referred to as pre-sync blocks for recording typically a preamble signal that indicates the leading edge of an audio recording zone 112. The data length of the pre-sync blocks is 6 bytes. The nine sync blocks (with sync block numbers 2 through 10) immediately succeeding the pre-sync blocks are used to record a 5-byte AAUX data that is auxiliary information for the audio information to be recorded and a 72-byte AUDIO data that is audio information for compressed sound. Then, the next five sync blocks (with sync block numbers 11 through 15) are used to record a 77-byte outer parity data. The data length of the sync blocks with sync block numbers 2 through 15 storing audio information and outer parity data is 90 bytes including an 8-byte inner parity data. The last sync block (with sync block number 16) is referred to as post sync block and used to record a post amble signal that indicates the trailing edge of the audio recording zone 112. The data length of the post sync block is 6 bytes.

Video information is recorded in the video recording zone 113 as data good for 152 sync blocks per track as shown in FIG. 11. Numbers 17 through 168 are assigned respectively to the 152 sync blocks.

The first two sync blocks (with sync block numbers 17 and 18) are referred to as pre-sync blocks for recording typically a preamble signal that indicates the leading edge of a video recording zone 113. The data length of the pre-sync blocks is 6 bytes. The two sync blocks (with sync block numbers 19 and 20) immediately succeeding the pre-sync blocks are used to record a VAUX data that is auxiliary information for the video information to be recorded. The next 135 sync blocks (with sync block numbers 21 through 155) are used to record a VIDEO data that is compressed video information. Then, the next sync block (with sync block numbers 156) is used to record another VAUX data that is also auxiliary information for the video information to be recorded. The next eleven sync blocks (with sync block numbers 157 through 167) are used to record an outer parity data. The data length of the sync blocks with sync block numbers 19 through 167 storing auxiliary information for video information, video information and the outer parity data is 90 bytes including an 8-byte inner parity data. The last sync block (with sync block number 168) is referred to as post sync block and used to record a post amble signal that indicates the trailing edge of the video recording zone 113. The data length of the post sync block is 6 bytes.

The AAUX data and the VAUX data are auxiliary data necessary for reproducing the audio information and the video information recorded there and may include information on the copy right, the recording mode, the sampling frequency and the television system involved there. Each AAUX data or VAUX data is a 5-byte pack data including a 1-byte pack header and 4-byte data.

The recording zone for AAUX data and VAUX data is divided in to a main area and an optional area. More specifically, the first 5 bytes of the data area of each of the audio sync blocks with sync block numbers 2 through 10 and the data area of the sync blocks with sync block numbers 19, 20 and 156 are divided into a main area and an optional area.

The main area is used to record indispensable packs without which it is impossible to reproduce the audio data and quasi-indispensable packs that are also highly important. The indispensable packs include those storing the data without which it is impossible to restore the image and the sound recorded on the magnetic tape, those storing the information telling how the image and the sound are recorded and those storing the information necessary for knowing the current position of the tape. More specifically, the indispensable packs include a pack storing the television system involved there, a pack storing the sampling frequency, a pack storing the number of quantization bits, a pack storing copy wright information, a pack storing the duration of recording and a pack storing the time codes. The quasi-indispensable packs include those storing information on the date of the recording, the time of the recording and the superimposition.

The optional area is used to record information on the ID of the manufacturer and the information that may be used when the data stored in the main area are not sufficient for realizing a desired functional feature.

The AAUX data to be stored in the main area (six packs with pack numbers 0 through 5) are actually recorded in the six sync blocks with sync block numbers 2 through 7 if the track has an odd track number as shown in FIG. 12(A). On the other hand, the AAUX data to be stored in the main area (six packs with pack numbers 3 through 8) are actually recorded in the six sync blocks with sync block numbers 5 through 10 if the track has an even track number as shown in FIG. 12(B).

The VAUX data to be stored in the main area (six packs with pack numbers 0 through 5) are actually recorded as the first 30 bytes of the data area of the sync block with sync block number 19 if the track has an odd number as shown in FIG. 13(A). On the other hand, the VAUX data to be stored in the main area (six packs with pack numbers 39 through 44) are actually recorded as the 46th through 75th bytes of the data area of the sync block with sync block number 156 if the track has an even number as shown in FIG. 13(B).

As described above, the position on the track of the main area for storing the auxiliary information to be used for reproducing audio data and video data varies depending on if the track is an odd number track or an even number track. This arrangement is used to make it possible to read the information in the main area without fail either by reading the odd number track or by reading the even number track even if the tape happens to be damaged for some reason or other. Thus, with this arrangement, the problem that the system data is, if partly, damaged as a result of repeated recording operations to make it impossible to reproduce the recorded image and/or the sound can be avoided.

With the DV format, video data and audio data are recorded on a DV tape by using the above described data structure.

Now, when an NTSC signal is recorded on a DV tape in the SD mode, since ten tracks are allocated to each frame, each frame invariably starts with a track having an even number (track number 0) and ends with a track having an odd number (track number 9). Thus, when an NTSC signal is recorded on a DV tape in the SD mode, the positional arrangement of the main area is same for any frames.

Then, when the tape is driven to run at a speed slower than the normal running speed of the tape for reproducing the recorded information (hereinafter to be referred to as slow reproduction) or when the data of a same frame is output continuously to get a still picture (hereinafter to be referred to as still reproduction), the positional arrangement of the main area remains unchanged for each frame. Thus, the auxiliary information to be used for reproducing the audio data and the video data stored in the main area can be reliably retrieved for slow reproduction or still reproduction so long as the operation of reproducing data from the frame is synchronized. Then, the audio data and the video data obtained by slow reproduction or still reproduction can be transmitted and recorded by the receiving set without the receiving set violating the formatting rules.

To the contrary, when an NTSC signal is recorded on a DV tape in the SDL mode, since five tracks are allocated to each frame, the positional arrangement of the main area varies between adjacent frames.

Take, for example, a frame (front frame) where the leading track has track number 0 as shown in FIG. 14(A). Then, the position of the main area of the first track for VAUX will be found in a rear portion of the VAUX data recording zone (from the $46^{th}$ byte to the $75^{th}$ byte of the data area of the sync block with sync block number 156). In the case of the rear frame located next to this front frame, the position of the main area of the first track for VAUX will be found in a front portion of VAUX data recording zone (the first 30 bytes of the data area of the sync block with sync block number 19). This when an NTSC signal is recorded on a DV tape in the SDL mode, the positional arrangement of the main area for recording VAUX data is inverted between the front frame and the rear frame and the same is true for AAUX data.

Because of this, when reproducing the NTSC signal in the SDL mode, a sync signal (to be referred to as FR signal hereinafter) having a cycle period of two frames and synchronized with the frame sync signal is used to discriminate the front frame and the rear frame showing respective positional arrangements of the main area that are different from each other. Thus, in the SDL mode, the positional arrangement of the main area of any frame can be identified so long as the front frame and the rear frame are discriminated from each other. Then, the auxiliary information recorded in the main area and used for reproducing audio data and video data can reliably be retrieved to successfully reproduce the audio and video data.

However, in the case of slow reproduction or still reproduction, a same frame will be reproduced continuously. Then, if the audio data and the video data obtained by slow reproduction or still reproduction are transmitted, the receiving set inevitably violates the formatting rules and hence cannot successfully record the transmitted data. For example, if the data recorded on a magnetic tape having front frames and rear frames as shown in FIG. 15(A) in the SDL mode are subjected to still reproduction, the reproduced data may be a repetition of the data of the front frame as shown in FIG. 15(B). If such a data is transmitted to a receiving set by way of an IEEE 1394 bus and recorded by the receiving set, the positional arrangement of the main area of the rear frame is not inverted relative to that of the front frame and hence the rear frame shows the positional arrangement of the main frame of the front frame. Then, as shown in FIG. 15(C), the receiving set will judge that the transmitted data is violating the formatting rules because it is not possible to determine if the transmitted frame is a front frame or a rear frame. Thus, the receiving set actually cannot record the transmitted data.

BRIEF SUMMARY OF THE INVENTION

In view of these circumstances, it is therefore the object of the present invention to provide a data transmission apparatus and a data transmission method adapted to reproduce digital data from a tape-shaped recording medium in a format corresponding to the recording format of the tape-shaped recording medium that is used for recording the data of a frame including video data on an odd number of tracks and then transmit the reproduced data that can be recorded at the receiving side without problem if the data are reproduced from the tape at a speed other than the normal running speed of the tape.

According to the invention, the above object is achieved by providing a data transmission apparatus comprising:

a data processing means for processing digital data in a format corresponding to the recording format of a tape-shaped recording medium for recording the data of a frame including video data on an odd number of tracks; and a transmission means for transmitting the digital data processed by said data processing means;

said recording format of a tape-shaped recording medium having two recording patterns for recording the video data of a frame on said odd number of tracks;

said transmission means adapted to transmit said digital data after adding an identification code for discriminating the data of a frame having an odd-numbered track for the start of recording and the data of a frame having an even-numbered track for the start of recording.

In another aspect of the invention, there is provided a data transmission method comprising steps of:

processing digital data in a format corresponding to the recording format of a tape-shaped recording medium for recording the data of a frame including video data on an odd number of tracks, said recording format of a tape-shaped recording medium having two recording patterns for recording the video data of a frame on said odd number of tracks; and transmitting said digital data after adding an identification code for discriminating the data of a frame having an odd-numbered track for the start of recording and the data of a frame having an even-numbered track for the start of recording.

With a data transmission apparatus and a data transmission method according to the invention, digital data are transmitted in a format corresponding to the recording format of a tape-shaped recording medium for recording the data of a frame including video data in an odd number of tracks, said recording format of a tape-shaped recording medium having two recording patterns for recording the video data of a frame on said odd number of tracks. Additionally, with a data transmission apparatus and a data transmission method according to the invention, an identification code for discriminating the data of a frame having an odd-numbered track for the start of recording and the data of a frame having an even-numbered track for the start of recording is added to the digital data to be transmitted.

Thus, with a data transmission apparatus and a data transmission method according to the invention, the transmitted digital data can be recorded at the receiving side without problem if the data are reproduced from the tape at a speed other than the normal running speed of the tape.

BRIEF DESCRIPTION OF THE SEVERAL VIEWS OF THE DRAWING

FIGS. 13A–13B are a schematic illustration of the main areas of the tracks of a frame for recording VAUX data.

FIGS. 15A–15B are a schematic illustration of the pattern of recording positions in the main areas of the tracks of a frame storing VAUX data when the data of the frame are reproduced and transmitted repeatedly in the SDL mode of the DV format.

DETAILED DESCRIPTION OF THE INVENTION

Now, the present invention will be described by referring to the accompanying drawings that illustrate a digital dubbing system realized by applying the present invention.

Figure 16:
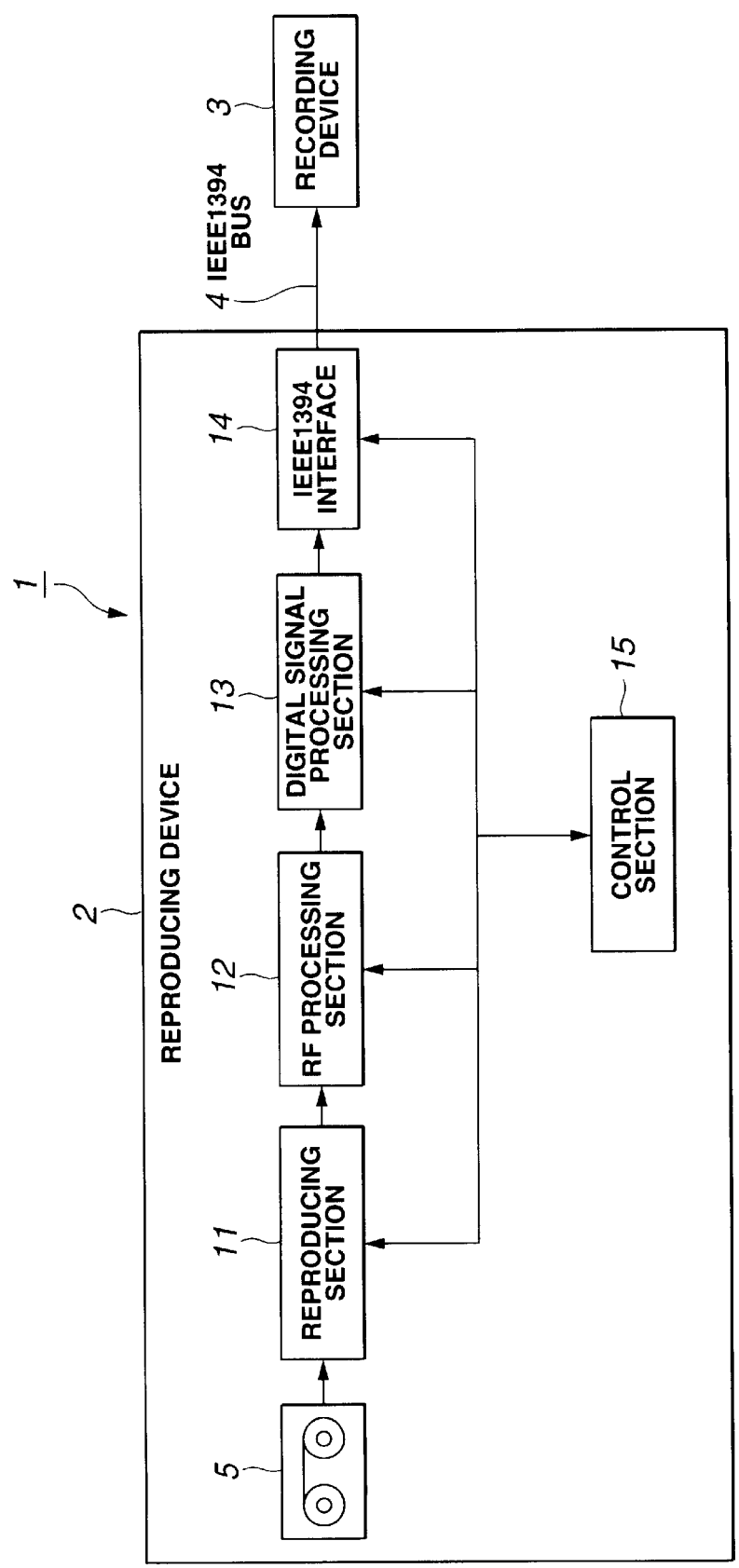
FIG. 16 is a schematic block diagram of a digital dubbing system realized by applying the present invention.

FIG. 16 is a schematic block diagram of a digital dubbing system realized by applying the present invention. The digital dubbing system 1 of FIG. 16 comprises a reproduction apparatus 2, a recording apparatus 3 and an IEEE 1394 bus 4 connecting the reproduction apparatus 2 and the recording apparatus 3. With the digital dubbing system 1, the DV data reproduced from a DV tape are transmitted from the reproduction apparatus 2 to the recording apparatus 3 by way of the IEEE 1394 bus 4 and subjected to a digital dubbing process of the recording apparatus 3 for recording the data on some other DV tape. The digital dubbing process is conducted in the SDL mode.

The reproduction apparatus 2 comprises a reproducing section 11, an RF processing section 12, a digital signal processing section 13, an IEEE 1394 interface section 14 and a control section 15.

The reproduction apparatus 2 reproduces source information including video data and audio data stored in a first DV tape. More specifically, DV data are stored in the SDL mode in the first DV tape 5 and the reproduction apparatus 2 is adapted to reproduce DV data in the SDL mode.

The reproducing section 11 has a rotary drum typically provided with a pair of magnetic heads that are adapted to the SDL mode and operate to reproduce DV signals recorded in the first DV tape 5. The reproducing section 11 then supplies the RF processing section 12 with the reproduced DV signals.

The RF processing section 12 performs a series of processing operations including a demodulation process and a digitizing process on the DV signals to produce digital DV data. The RF processing section 12 supplies the produced DV data to the digital signal processing section 13.

The digital signal processing section 13 by turn performs a series of processing operations for the DV format. Then, the digital signal processing section 13 supplies the processed DV data to the IEEE 1394 interface 14.

The IEEE 1394 interface 14 transforms the DV data fed from the digital signal processing section 13 into data that conform to the IEEE 1394 interface protocol to produce data to be transmitted. Then, the IEEE 1394 interface 14 transmits the data to be transmitted to the recording apparatus 3 by way of the IEEE 1394 bus 4.

The control section 15 controls the reproducing operations of the reproducing section 11, the signal processing operations of the RF processing section 12, the data processing operations of the digital signal processing section 12 and the data transmitting operations of the IEEE 1394 interface 14.

Thus, the reproduction apparatus 2 having the above described configuration can reproduce video data and audio data recorded in the first DV tape 5 and transmit the reproduced data by way of the IEEE 1394 bus 4.

The IEEE 1394 interface 14 adds to the data to be transmitted that conform to the IEEE 1394 protocol a piece of information indicating if the frame is a front frame or a rear frame according to the control command from the control section 15.

As discussed earlier, in the SDL mode of the DV format, there are front frames where the operation of recording a signal starts from an odd-numbered track (having track number 0) and rear frames where the operation of recording a signal starts from an even-numbered track (having track number 5). The IEEE 1394 interface 14 transforms the DV data fed from the digital signal processing section 13 into data to be transmitted that conform to the IEEE 1394 protocol and, at the same time, adds a piece of information indicating if each frame to be transmitted is a front frame or a rear frame to the data to be transmitted according to the control information from the control section 15.

Figures 17, 18:
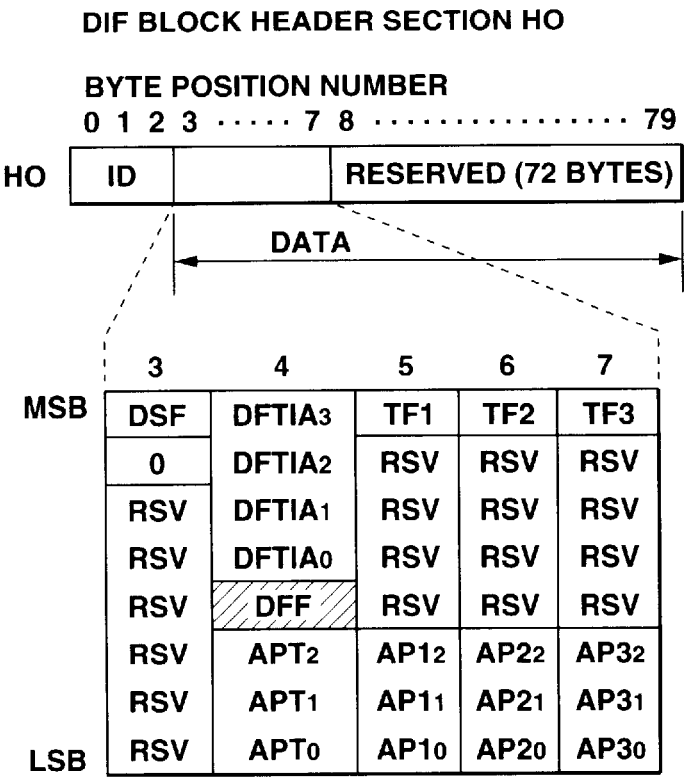
FIG. 17 is a schematic illustration of the location of storing a DFF for discriminating the front frame and the rear frame.
FIG. 18 is a schematic illustration of the information contained in a DFF.

More specifically, as shown in FIG. 17, a DFF (DIF frame flag) is added to the header section H0 of each DIF block defined on the IEEE 1394 bus to indicate if the frame is a front frame or a rear frame.

As shown in FIG. 18, the DFF takes a value of "1" or "0". In the case where the data to be transmitted are those of the NTSC system (525-60 system) in the SDL mode, DFF "0" indicates that the frame carrying this information is a front frame (first frame), whereas DFF "1" indicates that the frame carrying this information is a rear frame (second frame).

However, note that, in the case where the DV data to be transmitted are those of the SD mode or the HD mode or those of the PAL system (625-50 system) in the SDL mode, the DFF always takes the value of "1" so that it does not bear any specific means.

Because of the DFF added to the transmitted DV data, even if the reproduction apparatus 2 operates for slow reproduction or still reproduction on the DV data recorded in the SDL mode to repeatedly transmit a same frame having a certain positional arrangement of the main area for recording VAUX data and AAUX data, the recording apparatus 3 that receives the transmitted data can tell if each frame it receives is a front frame or a rear frame.

Figure 19:
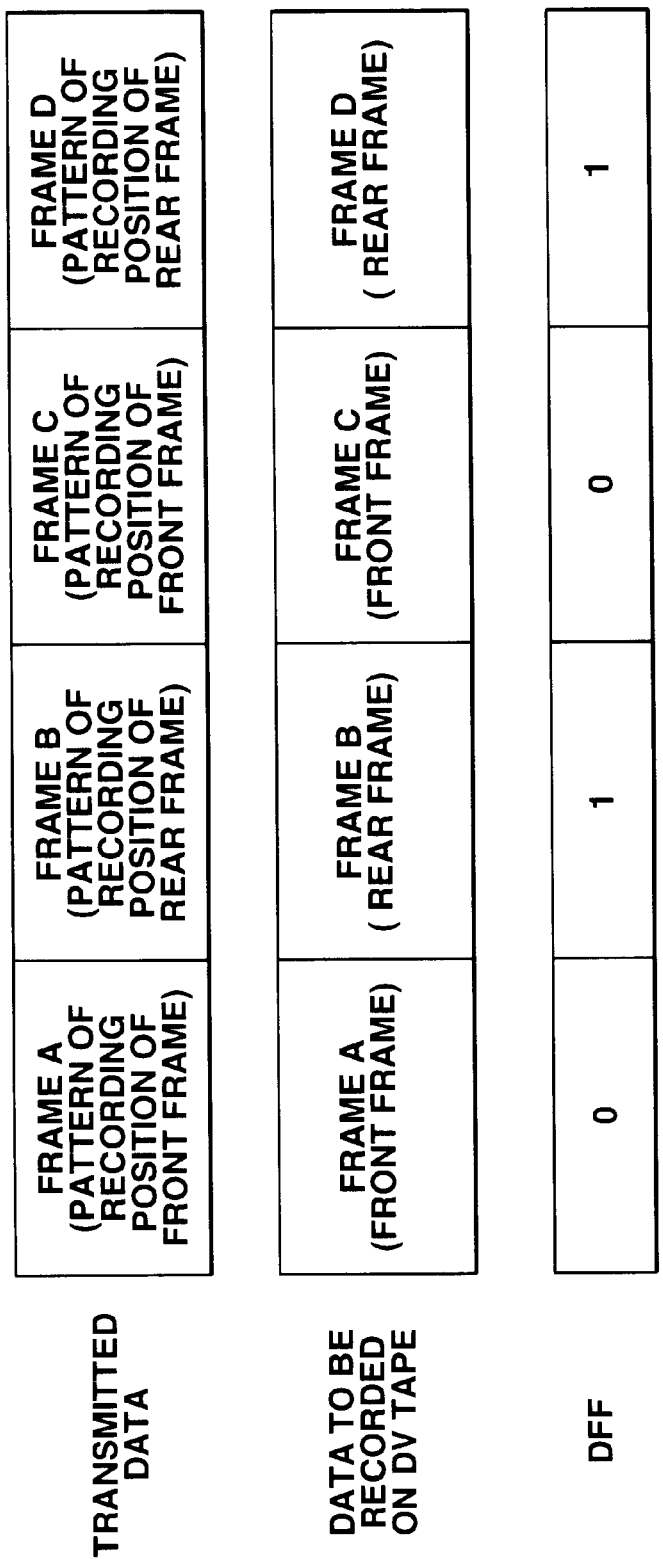
FIG. 19 is a schematic illustration of the relationship between the frame pattern to be used for storing data in a DV tape and the DFF when the data are reproduced normally.
Figure 20:
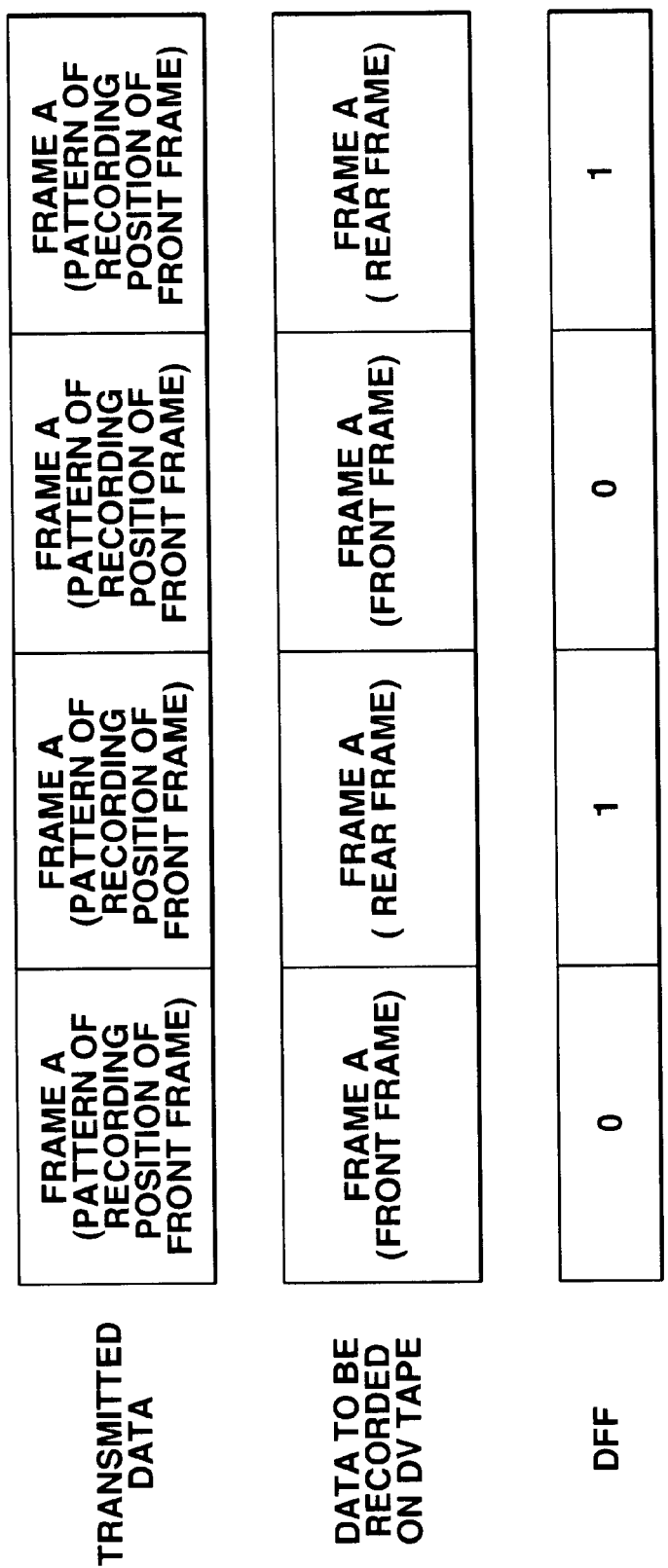
FIG. 20 is a schematic illustration of the relationship between the frame pattern to be sued for storing data in a DV tape and the DFF when the data are reproduced for a still image.

For example, in the case of normal reproduction as shown in FIG. 19, each of the frames to be recorded on a DV tape shows the positional arrangement of the main area for recording same as that of the corresponding frame transmitted to the recording apparatus 3. However, in the case of still reproduction as shown in FIG. 20 where a same frame is transmitted repeatedly and continuously, each of the frames to be recorded on the DV tape does not necessarily show the positional arrangement of the main area for recording that is same as that of the corresponding frame transmitted to the recording apparatus 3. Then, the reproduction apparatus 2 adds DFFs of "1s" and those of "0s" alternately to the respective signals of the frames to be transmitted with a cycle of two frames as shown in FIGS. 19 and 20 and the recording apparatus 3 detects the DFFs in order to record the frames properly.

Figure 21:
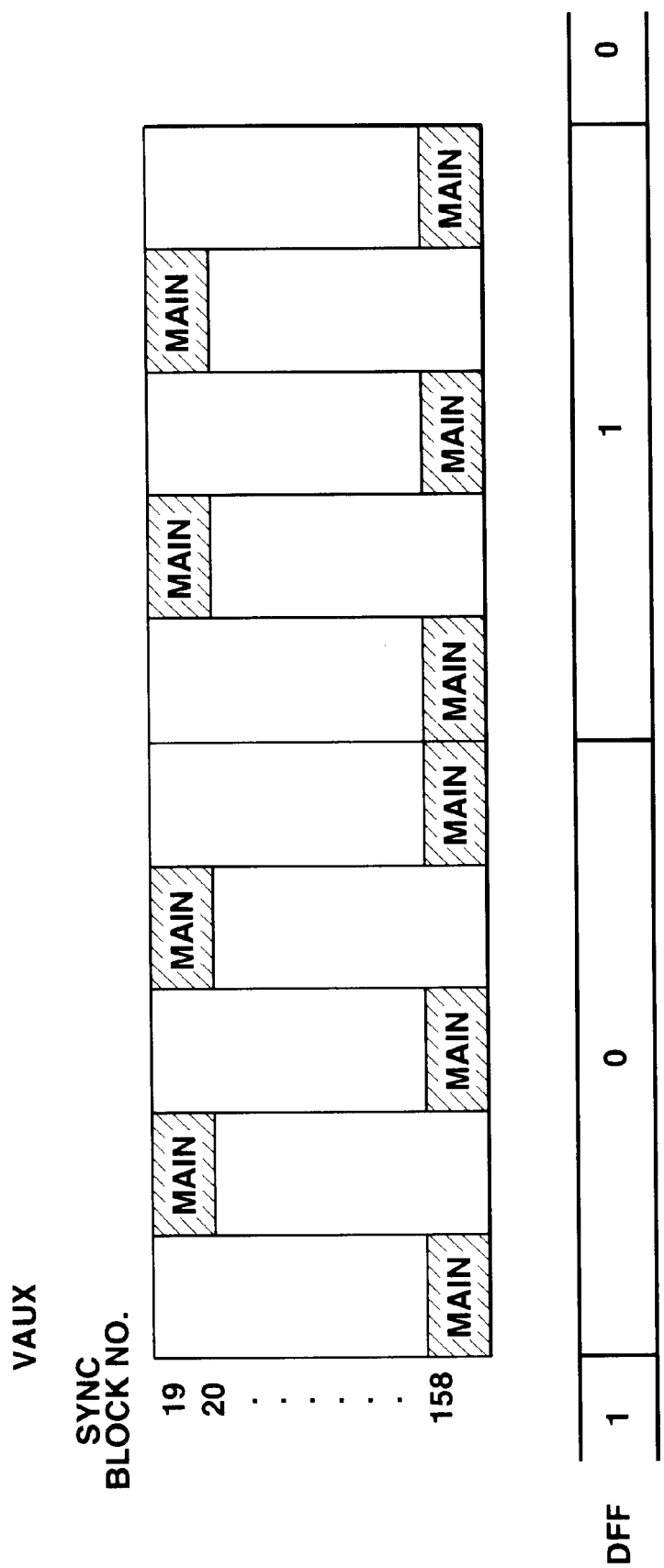
FIG. 21 is a schematic illustration of the relationship between the pattern of recording positions in the main areas of tracks of a frame and the DFF when the frame is repeatedly used.

Thus, as shown in FIG. 21, if a same frame having a certain positional arrangement of the main area for recording VAUX data is transmitted repeatedly and continuously, the DFFs added to the transmitted signals make it possible to discriminate front frames from rear frames so that the recording apparatus 3 can correctly reproduce the VAUX data without violating the formatting rules.

Now, the recording apparatus 3 will be described below.

Upon receiving the video data and the audio data transmitted from the reproduction apparatus 2, the recording apparatus 3 records them on a second DV tape 6. More specifically, the recording apparatus 3 records DV data in the second DV tape in the SDL mode.

Figure 22:
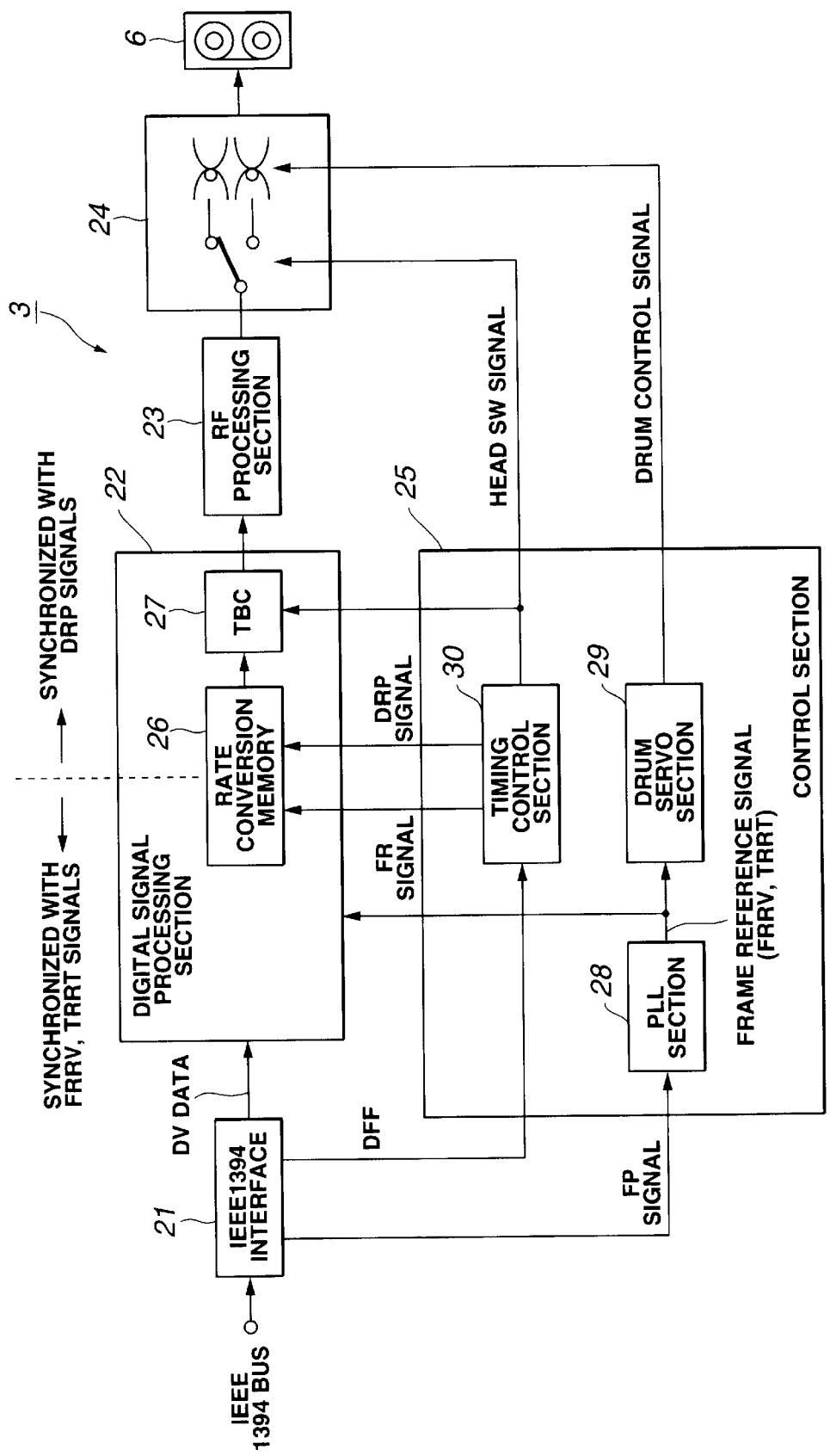
FIG. 22 is a schematic block diagram of the recording apparatus of the digital dubbing system of FIG. 16.

As shown in FIG. 22, the recording apparatus 3 comprises an IEEE 1394 interface 21, a digital signal processing section 22, an RF processing section 23, a recording section 24 and a control section 25.

The digital signal processing section 22 has a rate conversion memory 26 and a time base controller (TBC) 27 therein. On the other hand, control section 25 has a PLL section 28, a drum servo section 29 and a timing control section 30 therein.

The IEEE 1394 interface 21 receives the data transmitted by way of the IEEE 1394 bus 4 and transforms the received data in to DV data conforming to the IEEE 1394 interface protocol. The IEEE 1394 interface 21 also detects the DFF added to the header section H0 of each DIF block of the transmitted data. Additionally, the IEEE 1394 interface 21 detects the FP signals contained in the transmitted data. An FP signal is a frame sync signal. The IEEE 1394 interface 21 supplies the DV data it produces to the digital signal processing section 22, the detected FP signals to the PLL section 28 in the control section 25 and the DFFs to the timing control section 30 in the control section 25.

The digital signal processing section 22 performs a data processing operation on the DV data fed from the IEEE 1394 interface 21 to make it possible to record the data on the second DV tape. Then, the digital signal processing section 22 temporarily stores the processed DV data in the rate conversion memory 26 therein on the basis of unit data to be recorded on a track. The rate conversion memory 26 has a memory capacity that is large enough for storing the data of two frames (and hence 10 tracks in the SDL mode) in the case of the NTSC system. The rate conversion memory 26 has memory areas corresponding to the respective track numbers so that, when the data with a certain track number is input, the input data is stored in the memory area provided for the track number. The digital signal processing section 22 supplies the DV data stored in the rate conversion memory 26 on a track by track basis to the TBC 27 also on a track by track basis with the timing controlled by the control section 25. The TBC 27 outputs the data read out from the rate conversion memory 26 to the RF processing section 23 on a track by track basis in synchronism with head SW signals. The TBC 27 corrects any out of phase condition that may exists between the signal to be recorded on a track with an even number and a signal to be recorded on a track with an odd number of the second DV tape in intermittent recording.

The rate conversion memory 26 of the digital signal processing section 22 eliminate the discrepancy, if any, between the timing of processing the data transmitted by way of the IEEE 1394 bus 4 and that of processing the data for recording them on the DV tape. More specifically, the data to be recorded on the second DV tape 6 are temporarily stored in the rate conversion memory 26 and output therefrom in synchronism with the rotary motion of the rotary drum.

The RF processing section 23 modulates the DV data fed from the digital processing section 22 to generate signals to be recorded. Then, the RF processing section 23 supplies the recording section 24 with the generated signals.

The recording section 24 comprises a rotary drum typically provided with a pair of magnetic heads and records the signals fed from the RF processing section 23 in the second DV tape in the SDL mode. The signals to be recorded are fed to the two magnetic heads that are switched for operation by a switching circuit 24a. The switching circuit 24a is controlled for its switching operation by a head SW signal sent from the control section 25. The rotary drum is controlled for its rotational speed by a drum control signal sent from the control section 25.

The PLL section 28 of the control section 25 synchronizes the FP signal sent from the IEEE 1394 interface 21 with its own internal clock and generates frame reference signals. Frame reference signals include an FRRV signal and a TRRT signals. The FRRV signal is a signal whose rising edge shows the timing of starting an operation of writing the data of a frame in the rate conversion memory 26. In other words, it is a signal showing the timing of starting the operation of writing the data of a track with track number 0 or track number 5 in the rate conversion memory 26. The TRRT signal is a signal whose rising edge shows the timing of starting an operation of writing the data of a track in the rate conversion memory. The FRRV signal and the TRRT signal are synchronized and, in the SDL mode where the data of a frame are written on five tracks, the cycle of the TRRT signal is five times as long as that of the FRRV signal.

The drum servo section 28 of the control section 25 generates a drum control signal on the basis of the frame reference signals produced by the PLL section 27 and supplies the recording section 24 with the generated drum control signal to control the rotary motion of the rotary drum.

The timing control section 30 of the control section 25 generates an FR signal on the basis of the DFFs fed from the IEEE 1394 interface 21. The FR signal is a signal indicating if the data of a track to be written in the rate conversion memory 26 are those of a rear frame or those of a front frame. It refers to a front frame when it is equal to "0" but it refers to a rear frame when it is equal to "1". More specifically, the FR signal is a signal that indicates if the data of a track to be written in the rate conversion memory 26 are those with track numbers 0 through 4 or those with track numbers 5 through 9. The RF signal is fed to the rate conversion memory 26 of the digital signal processing section 22. If the RF signal indicates a front frame, the rate conversion memory 26 stores the data in a storage area corresponding to the track numbers of the front frame (track numbers 0 through 4) if the FR signal refers to a front frame but stores the data in a storage area corresponding to the track numbers of the rear frame (track numbers 5 through 9) if the FR signal refers to a rear frame.

Figure 1:
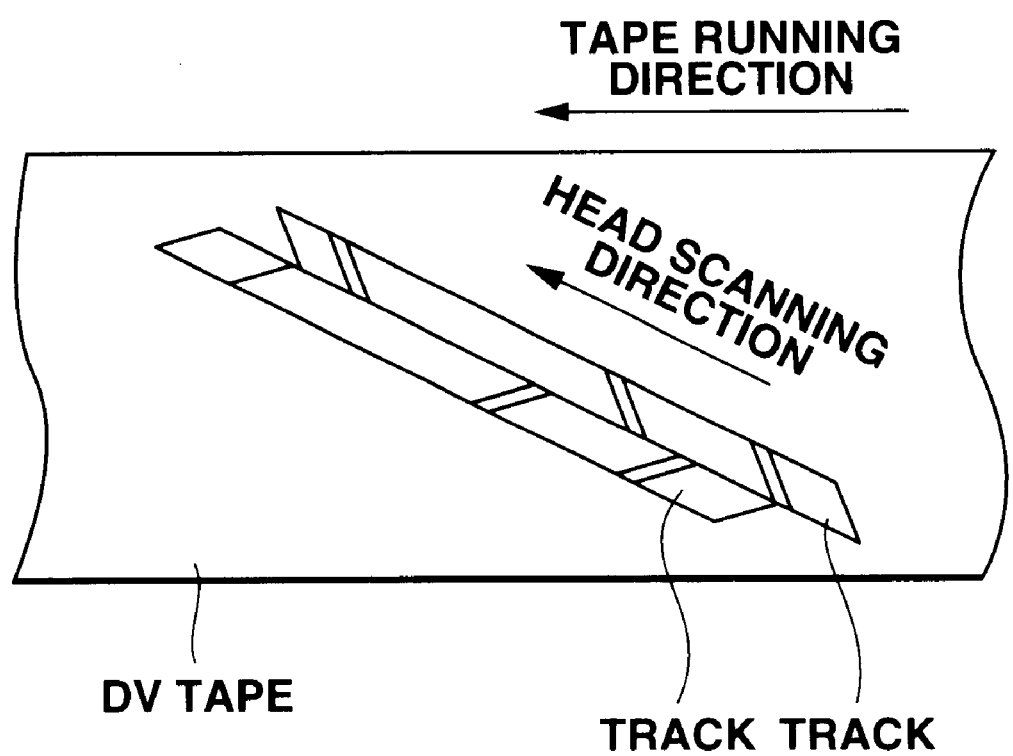
FIG. 1 is a schematic illustration of the track pattern of a DV tape for recording digital data in the DV format.
Figure 2:
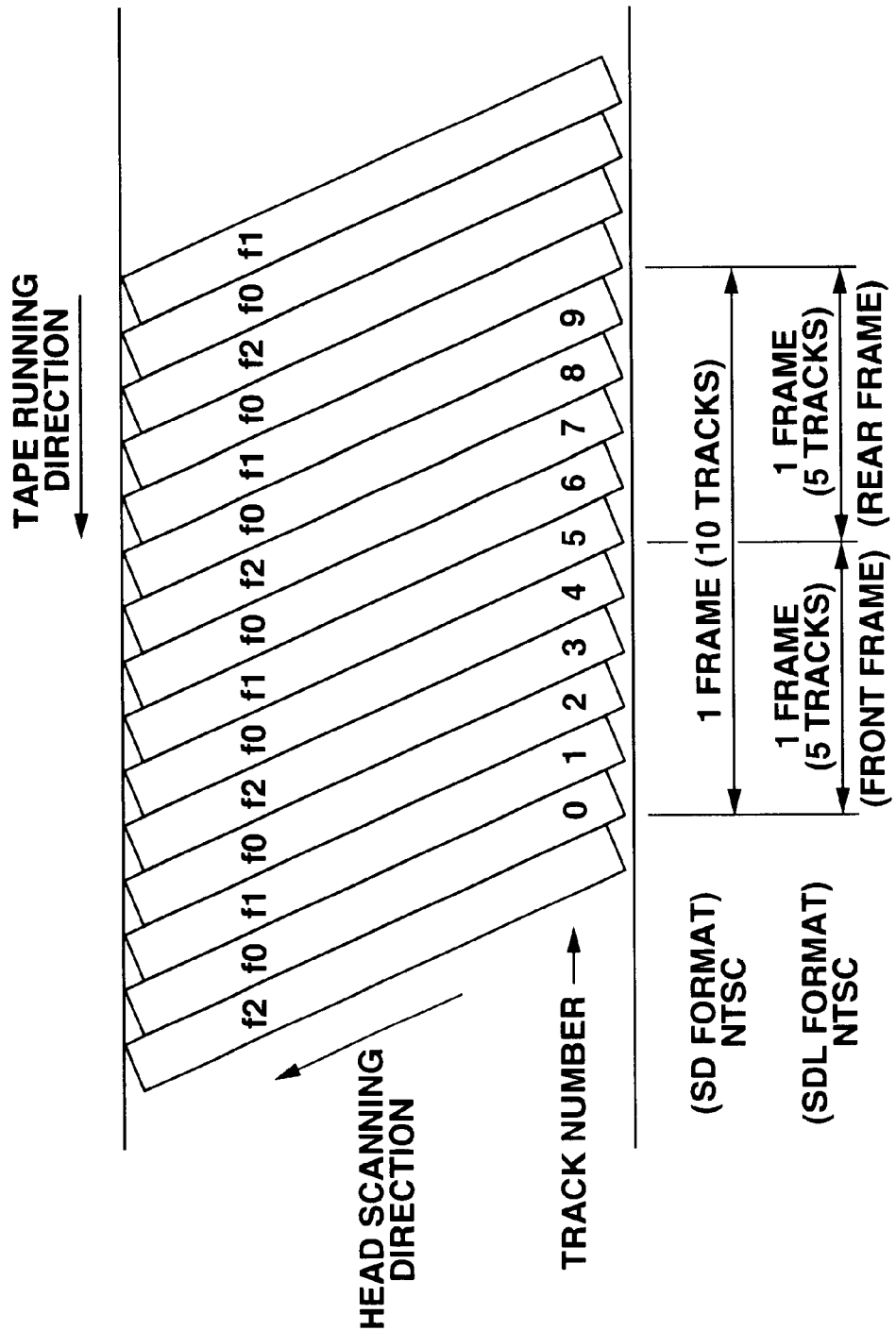
FIG. 2 is a schematic illustration of the track numbers assigned to the respective tracks of a DV tape and the processing unit in the DV format.
Figure 3:
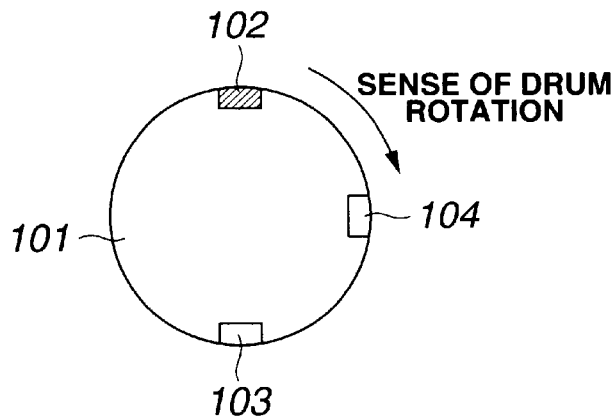
FIG. 3 is a schematic illustration of a rotary drum adapted to record and reproduce digital data in both the SD mode and the SDL mode of the DV format.
Figure 4:
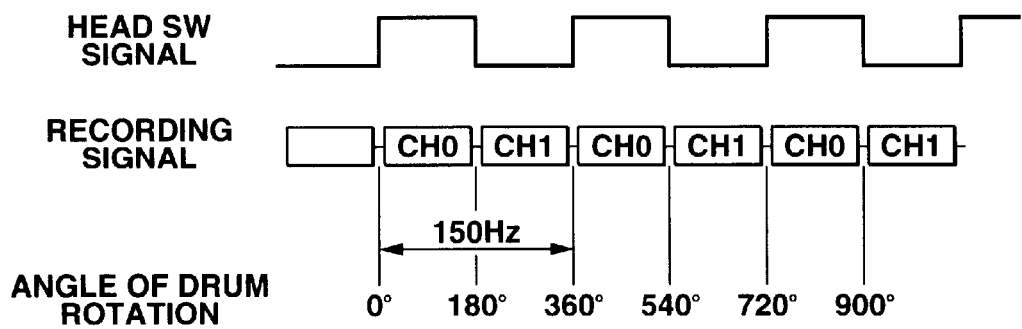
FIG. 4 is a schematic illustration of a head switching operation in the SD mode of the DV format.
Figure 5:
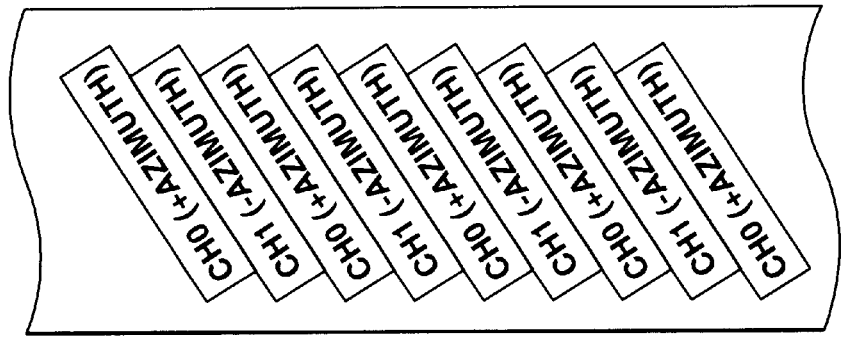
FIG. 5 is a schematic illustration of the track pattern when data are recorded in the SD mode of the DV format.
Figure 6:
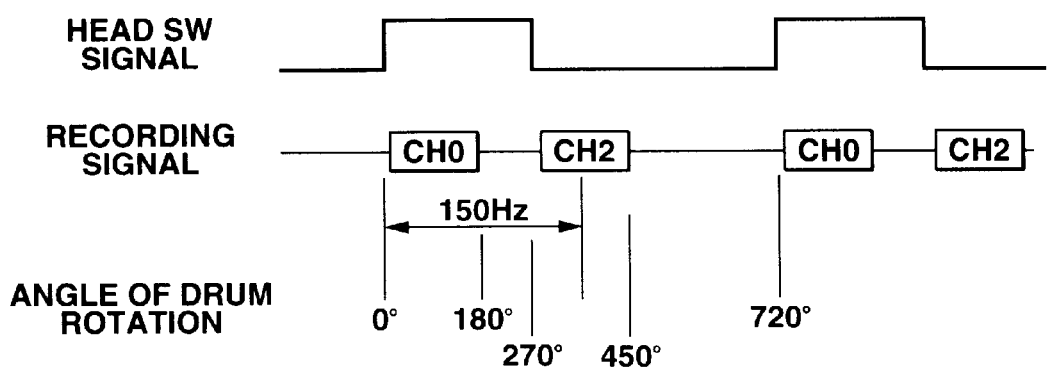
FIG. 6 is a schematic illustration of a head switching operation in the SDL mode of the DV format.
Figure 7:
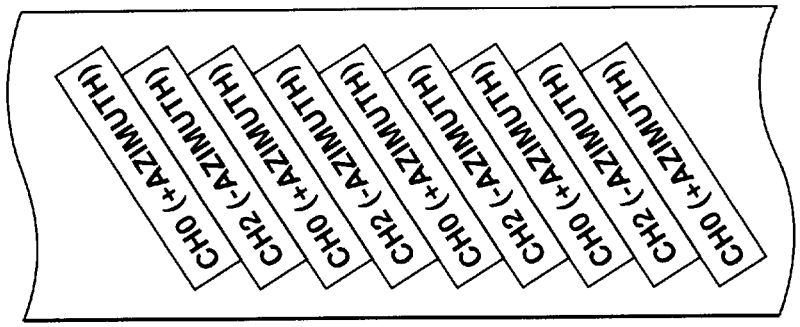
FIG. 7 is a schematic illustration of the track pattern when data are recorded in the SDL mode of the DV format.
Figure 8:
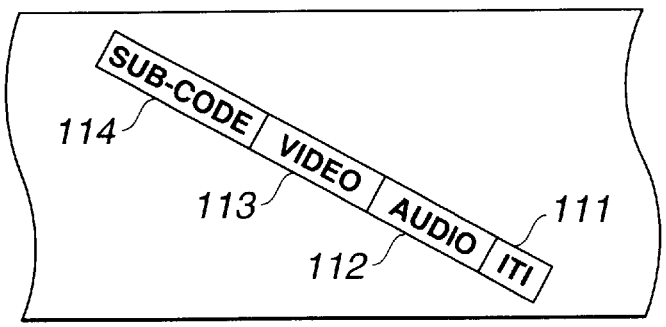
FIG. 8 is a schematic illustration of the data recorded on a track.
Figure 9:
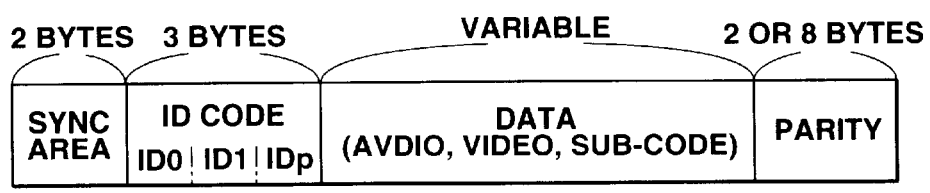
FIG. 9 is a schematic illustration of a sync block.
Figure 10:
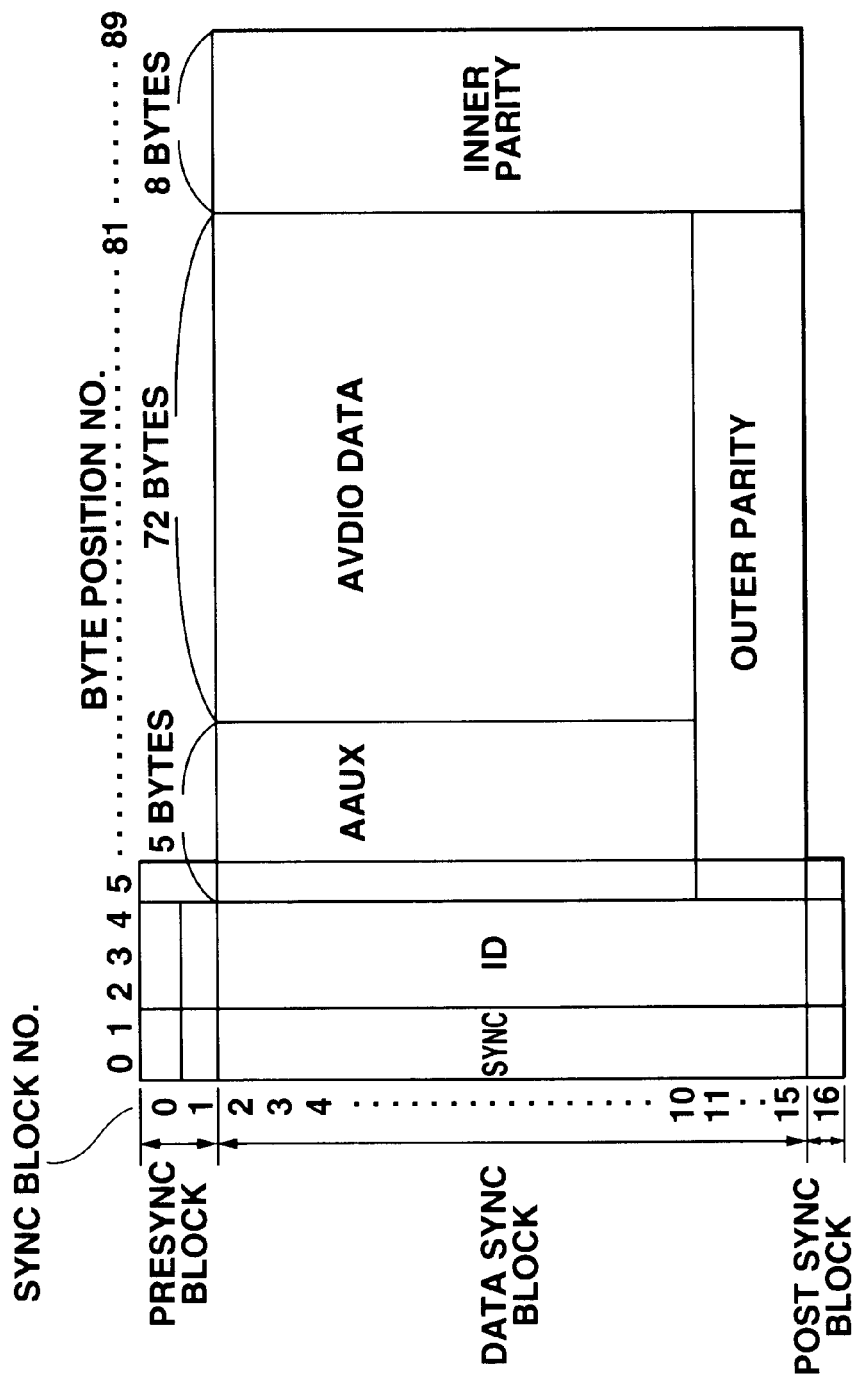
FIG. 10 is a schematic illustration of the composition of the data to be recorded in an audio recording zone.
Figure 11:
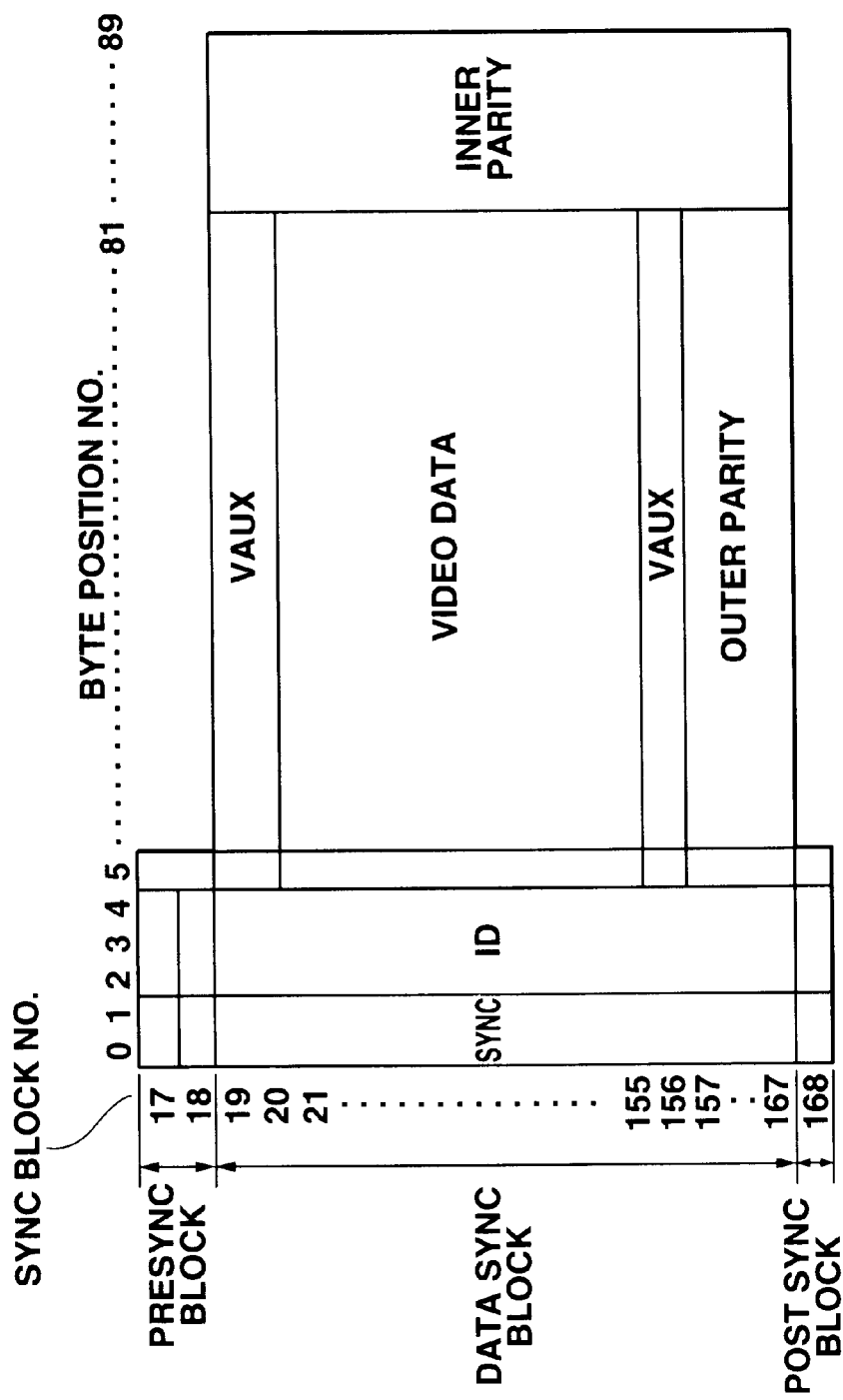
FIG. 11 is a schematic illustration of the composition of the data to be recorded in a video recording zone.
Figure 12A:
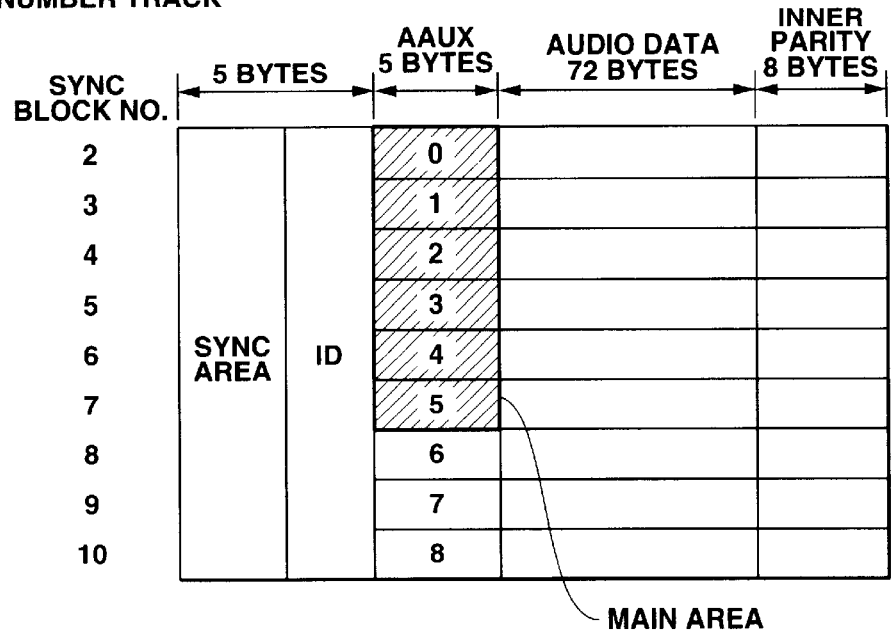
FIGS. 12A–12B are a schematic illustration of the main areas of the tracks of a frame for recording AAUX data.
Figure 12B:
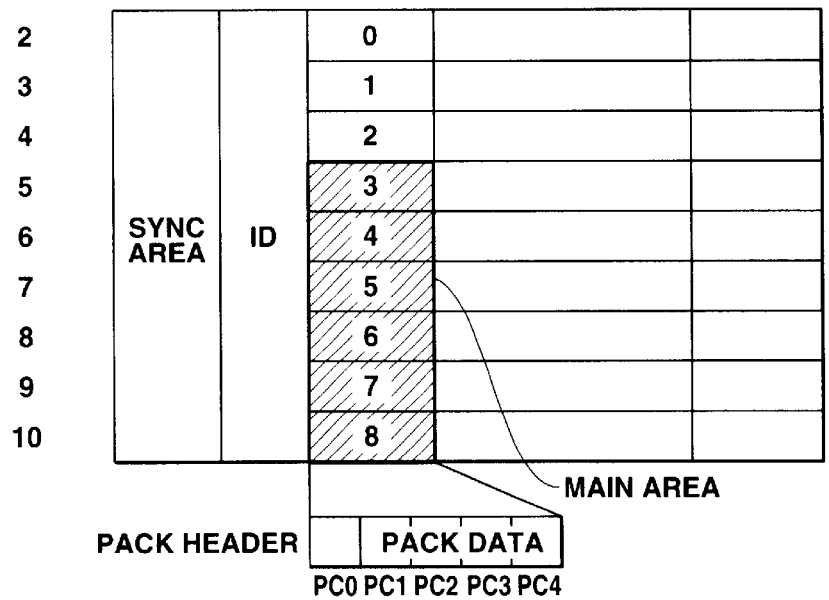
Figure 14A:
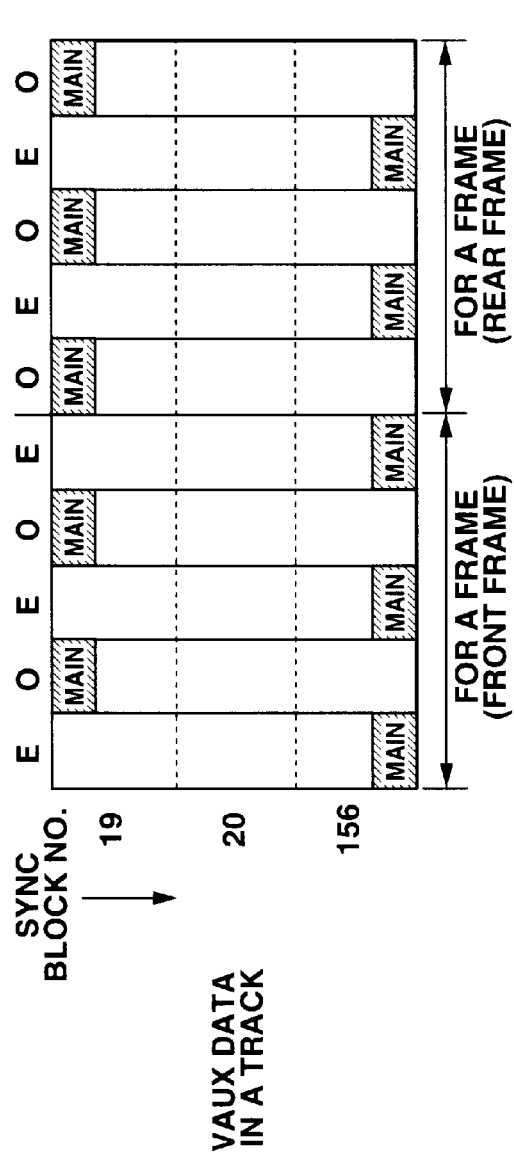
FIGS. 14A–14B are a schematic illustration of the pattern of recording positions in the main areas of the tracks of a frame storing VAUX data when recorded in the SDL mode of the DV format.
Figure 14B:
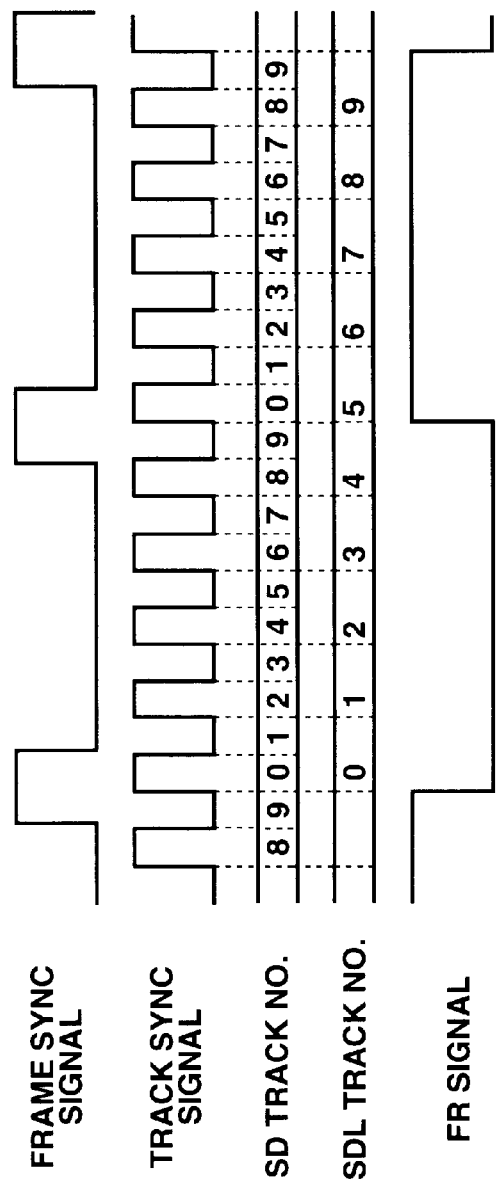

The timing control section 30 of the control section 25 generates a DRP signal that is a reference signal synchronized with the rotary phase of the rotary drum and a head SW signal. The DRP signal is a reference signal of the recording side indicating the recording/reproducing time of a track. The head SW signal is a signal for switching the operation of the two magnetic heads provided on the rotary drum. The head SW signal is adapted to switch the intermittent recording operation of the two magnetic heads (CH0, CH2) in the SDL mode, the two magnetic heads being separated from each other by an angle of 90° on the rotary drum as shown in FIG. 3. The timing control section 30 synchronizes the generated head SW signal and the FR signal. More specifically, while the generated head SW signal is adapted to show either of two phases relative to the FR signal, the timing control section 30 synchronizes the head SW signal with the FR signal in terms of phase in such a way that the data for the track with track number 0 may be recorded by means of the head that is adapted to record data on even-numbered tracks.

Figure 23:
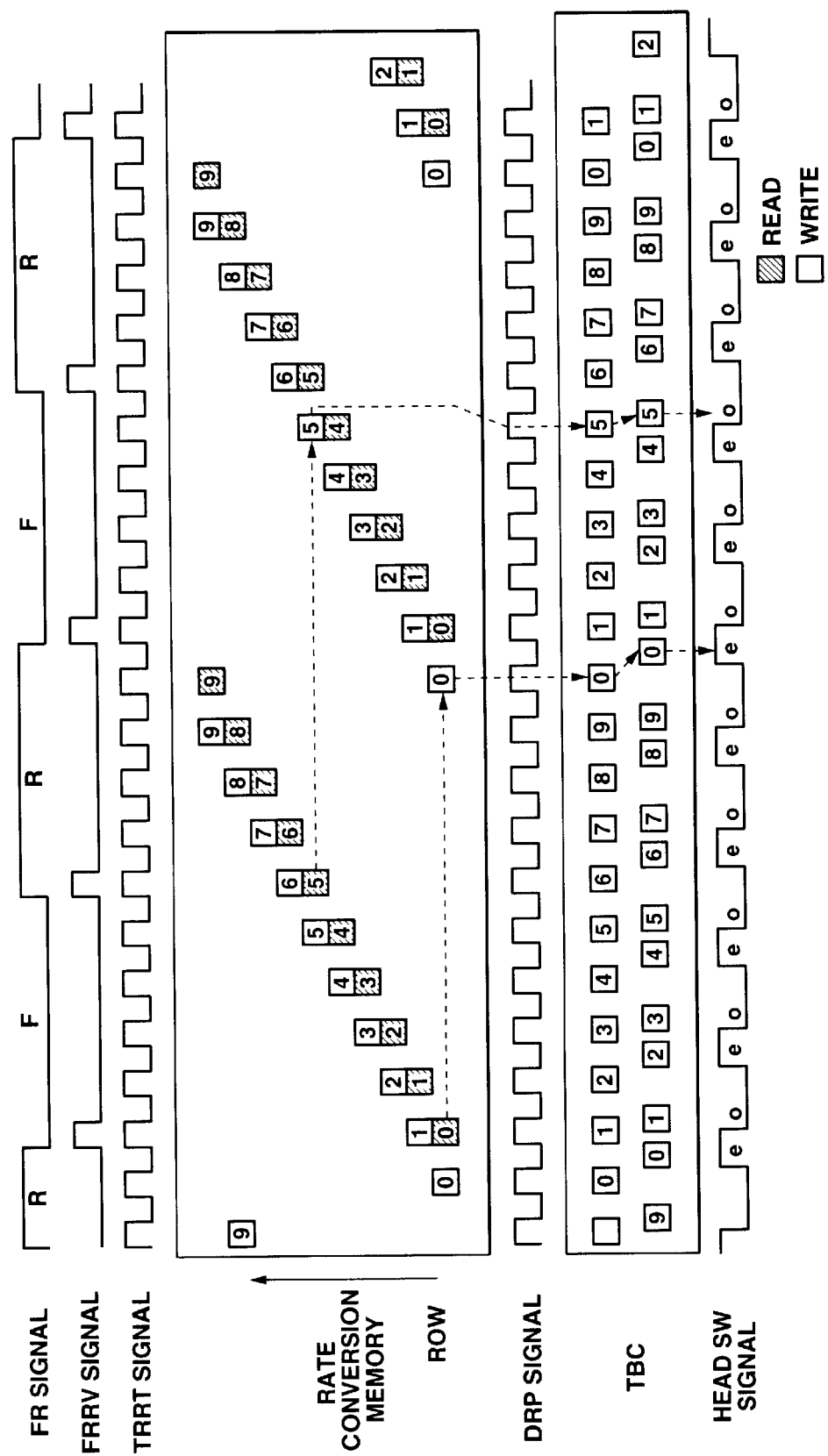
FIG. 23 is a timing chart of various signals used in the recording apparatus of FIG. 22.

In the recording apparatus 3 having the above described configuration, the data of a track are written in and read out from the rate conversion memory 26 with the timing as shown in FIG. 23.

Firstly, the data of the tracks with track numbers 0 through 4 of the front frame and the data of the tracks with track numbers 5 through 9 of the rear frame are sequentially written in the rate conversion memory 26 in synchronism with the frame reference signals (FRRV, TRRT). For this operation, the rate conversion memory 26 refers to the FR signals to determine if the supplied data are those of the front frame or those of the rear frame and it stores the data in the storage area for the tracks with track numbers 0 through 4 if the data are those for the front frame, whereas it stores the data in the storage area for the tracks with track numbers 5 through 9.

The data stored in the rate conversion memory 26 are then read out before the start of an operation of writing data on a track having the same track number and then fed to the TBC 27. More specifically, since the rate conversion memory 26 has a memory capacity that is large enough for storing the data of two frames (10 tracks), the data written for a track have to be read out before the period of time of two frames elapses from the time when the data are written. The data are read out in synchronism with the DRP signal.

The TBC 27 outputs the signals read out from the rate conversion memory 26 in synchronism with the head SW signal. The head SW signal is a signal whose rising edge shows the timing of starting an operation of writing data on a track with an even number and whose falling edge shows the timing of starting an operation of writing data on a track with an odd number. Since the head SW signal is synchronized with the FR signal, its phase is so arranged that the CH0 head is used to write data on tracks with even numbers (track numbers 0, 2, 4, 6, 8) and the CH2 head is used to write data on tracks with odd numbers (track numbers 1, 3, 5, 7, 9).

Thus, as described above, in the recording apparatus 3, the timing control section 30 of the control section 25 generates an FR signal on the basis of the DFFs fed from the IEEE 1394 interface 21. Then, data are written in the rate conversion memory 26 of the recording apparatus 3 by referring to the FR signal to make it possible to reliably and easily discriminate front frames from rear frames. Additionally, since the FR signal and the head SW signal are synchronized relative to each other when data are written in the second magnetic tape 6 by the recording apparatus 3, the arrangement of front frames and rear frames would not be inverted to violate the formatting rules for recording data.

What is claimed is:

1. A data transmission apparatus comprising:
   a data processing means for processing digital data in a format corresponding to the recording format of a tape-shaped recording medium for recording the data of a frame including video data on an odd number of tracks; and
   a transmission means for transmitting the digital data processed by said data processing means;
   said recording format of a tape-shaped recording medium having two recording patterns for recording the video data of a frame on said odd number of tracks;
   said transmission means adapted to transmit said digital data after adding an identification code for discriminating the data of a frame having an odd-numbered track for the start of recording and the data of a frame having an even-numbered track for the start of recording.

2. A data transmission apparatus according to claim 1, wherein
   the recording format of said tape-shaped recording medium is a format adapted to the SDL mode of the DV format and
   said transmission means is adapted to transmit digital data onto an IEEE 1394 bus.

3. A data transmission apparatus according to claim 2, wherein
   said transmission means is adapted to transmit said digital data onto the IEEE 1394 bus after adding an identification code for discriminating the data of a frame having an odd-numbered track for the start of recording and the data of a frame having an even-numbered track for the start of recording.

4. A data transmission method comprising steps of:
   processing digital data in a format corresponding to the recording format of a tape-shaped recording medium for recording the data of a frame including video data on an odd number of tracks, said recording format of a tape-shaped recording medium having two recording patterns for recording the video data of a frame on said odd number of tracks; and
   transmitting said digital data after adding an identification code for discriminating the data of a frame having an odd-numbered track for the start of recording and the data of a frame having an even-numbered track for the start of recording.

5. A data transmission method according to claim 4, wherein
   the recording format of said tape-shaped recording medium is a format adapted to the SDL mode of the DV format and
   digital data are transmitted onto an IEEE 1394 bus.

6. A data transmission method according to claim 5, wherein
   said digital data are transmitted onto the IEEE 1394 bus after an identification code for discriminating the data of a frame having an odd-numbered track for the start of recording and the data of a frame having an even-numbered track for the start of recording is added thereto.

* * * * *